(12) United States Patent
Fukumoto

(10) Patent No.: US 12,097,857 B2
(45) Date of Patent: Sep. 24, 2024

(54) TRAVEL CONTROLLER, METHOD FOR TRAVEL CONTROL, AND PLATOONING CONTROL SYSTEM

(71) Applicant: TOYOTA JIDOSHA KABUSHIKI KAISHA, Toyota (JP)

(72) Inventor: Kazuma Fukumoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 18/055,465

(22) Filed: Nov. 15, 2022

(65) Prior Publication Data

US 2023/0202478 A1 Jun. 29, 2023

(30) Foreign Application Priority Data

Dec. 23, 2021 (JP) ................................. 2021-209642

(51) Int. Cl.
*B60W 30/00* (2006.01)
*B60W 30/165* (2020.01)
(Continued)

(52) U.S. Cl.
CPC .......... *B60W 30/165* (2013.01); *B60W 40/04* (2013.01); *G05D 1/0293* (2013.01);
(Continued)

(58) Field of Classification Search
CPC ............... B60W 30/165; B60W 40/04; B60W 2554/4041; B60W 2556/25;
(Continued)

(56) References Cited

U.S. PATENT DOCUMENTS

2010/0256852 A1* 10/2010 Mudalige ................. G08G 1/22
701/24
2019/0147745 A1* 5/2019 Kim ....................... G08G 1/167
701/301
(Continued)

FOREIGN PATENT DOCUMENTS

CA 2841067 A1 * 1/2013 ............ B60W 10/04
GB 2551248 A * 12/2013 ............ G08G 1/167
(Continued)

*Primary Examiner* — Peter D Nolan
*Assistant Examiner* — Peter Y Ning
(74) *Attorney, Agent, or Firm* — Dickinson Wright, PLLC

(57) ABSTRACT

A platooning control system includes a platoon controller that generates environmental maps used for platooning of vehicles, and a travel controller that controls travel of a following vehicle following a leading vehicle. The platoon controller generates the environmental maps each representing the position of an object around the vehicles, and delivers the maps to the following vehicle. The travel controller transmits object information indicating the position of an object detected from environmental data outputted by an environmental sensor mounted on the following vehicle to the platoon controller, executes update so that the position of the object represented in the latest environmental map is changed to the position of the object at the time when the following vehicle reaches the position of the leading vehicle represented in the latest environmental map, and controls travel of the following.

5 Claims, 11 Drawing Sheets

(51) Int. Cl.
  *B60W 40/04* (2006.01)
  *G05D 1/00* (2006.01)
  *G08G 1/00* (2006.01)
(52) U.S. Cl.
  CPC ............ *G05D 1/0295* (2013.01); *G08G 1/22*
    (2013.01); *B60W 2554/4041* (2020.02); *B60W*
    *2556/25* (2020.02); *B60W 2556/40* (2020.02)
(58) Field of Classification Search
  CPC ............ B60W 2556/40; G05D 1/0293; G05D
    1/0295; G05D 1/0274; G05D 1/0246;
    G08G 1/22; G08G 1/167
  See application file for complete search history.

(56) References Cited

U.S. PATENT DOCUMENTS

| 2019/0384322 | A1* | 12/2019 | Luckevich | ............ | G05D 1/0285 |
| 2020/0286387 | A1* | 9/2020 | Zhou | .................... | G08G 1/0175 |
| 2020/0361369 | A1* | 11/2020 | Yamaguchi | ........... | B60Q 1/5037 |
| 2020/0369269 | A1* | 11/2020 | Tanaka | ............. | G08G 1/096725 |
| 2021/0041893 | A1* | 2/2021 | Matsumoto | .......... | G05D 1/0293 |
| 2021/0304618 | A1* | 9/2021 | Okuyama | ............ | G05D 1/0295 |
| 2022/0114433 | A1* | 4/2022 | Lu | ........................... | H04W 4/40 |
| 2022/0383753 | A1* | 12/2022 | Kim | ........................ | G08G 1/166 |
| 2023/0063010 | A1* | 3/2023 | Zhang | ..................... | G08G 1/22 |

FOREIGN PATENT DOCUMENTS

| JP | 2020021342 A | 2/2020 |
| WO | 2019/039281 A1 | 2/2019 |

\* cited by examiner

TRAVEL CONTROLLER, METHOD FOR TRAVEL CONTROL, AND PLATOONING CONTROL SYSTEM

FIELD

The present disclosure relates a travel controller, a method, and a platooning control system for controlling travel of a platoon of vehicles.

BACKGROUND

Platooning of a plurality of vehicles can be achieved by automatically controlling travel of a vehicle following a leading vehicle traveling by autonomous or manual driving.

Japanese Unexamined Patent Publication No. 2020-021342 (hereafter "Patent Literature 1") describes a platooning system in which a leading vehicle and a following vehicle following the leading vehicle by autonomous driving travel as a platoon. In the platooning system described in Patent Literature 1, the leading vehicle transmits a predicted collision time required to collide with an obstacle to the following vehicle, and the following vehicle increases the distance to the leading vehicle when the leading vehicle is predicted to steer abruptly, based on variations in the predicted collision time.

SUMMARY

The platooning system described in Patent Literature 1 takes account of a predicted time required to collide with a nearby object, but does not take account of the position of the nearby object. Thus the following vehicle in the platooning system described in Patent Literature 1 may fail to keep a sufficient distance from the nearby object.

It is an object of the present disclosure to provide a platooning control system that can control platooning of a plurality of vehicles appropriately.

A travel controller according to the present disclosure is a travel controller for controlling travel of a following vehicle following a leading vehicle of a plurality of vehicles traveling as a platoon. The travel controller includes a processor configured to detect the position of at least one object represented in environmental data outputted by an environmental sensor mounted on the following vehicle from the environmental data, and transmit object information indicating the position of the detected object to a platoon controller configured to generate environmental maps each representing the position of an object in an area around the leading vehicle. The processor of the travel controller is further configured to update the latest of the environmental maps delivered sequentially from the platoon controller, based on time-varying changes in the position of the object represented in environmental maps delivered earlier than the latest environmental map, so that the position of the object represented in the latest environmental map is changed to the position of the object at the time when the following vehicle reaches the position of the leading vehicle represented in the latest environmental map, and control travel of the following vehicle so that the distance between the following vehicle and the object represented in the updated environmental map is not less than a predetermined distance.

The processor of the travel controller according to the present disclosure, at the update, preferably updates the environmental map so that the environmental map indicates probabilities that an object exists in respective regions included in the environmental map at the time when the following vehicle reaches the position of the leading vehicle represented in the environmental map.

The processor of the travel controller according to the present disclosure, at the transmission, preferably transmits the object information indicating the position of one of the at least one object detected inside a predetermined area around a predetermined trajectory of the platoon to the platoon controller, and does not transmit the object information indicating the position of one of the at least one object detected outside the predetermined area to the platoon controller.

A method for travel control according to the present disclosure is a method for controlling travel of a following vehicle following a leading vehicle of a plurality of vehicles traveling as a platoon. The method includes detecting the position of an object represented in environmental data outputted by an environmental sensor mounted on the following vehicle from the environmental data; and transmitting object information indicating the position of the detected object to a platoon controller configured to generate environmental maps each representing the position of an object in an area around the leading vehicle. The method further includes updating the latest of the environmental maps delivered sequentially from the platoon controller, based on time-varying changes in the position of the object represented in environmental maps delivered earlier than the latest environmental map, so that the position of the object represented in the latest environmental map is changed to the position of the object at the time when the following vehicle reaches the position of the leading vehicle represented in the latest environmental map; and controlling travel of the following vehicle so that the distance between the following vehicle and the object represented in the updated environmental map is not less than a predetermined distance.

A platooning control system according to the present disclosure includes a platoon controller configured to generate environmental maps used for platooning of a plurality of vehicles, and one or more travel controllers configured to respectively control travel of one or more following vehicles following a leading vehicle traveling at the front of the plurality of vehicles. The platoon controller includes a processor configured to generate the environmental maps each representing the position of an object in an area around the plurality of vehicles, using object information indicating the position of an object detected from environmental data outputted by environmental sensors respectively mounted on the plurality of vehicles, and deliver the environmental maps to each of the one or more following vehicles. One of the travel controllers, which controls travel of one of the one or more following vehicles, includes a processor configured to detect the position of an object represented in environmental data outputted by an environmental sensor mounted on the one following vehicle from the environmental data, and transmit object information indicating the position of the detected object to the platoon controller. The processor of the travel controller is further configured to update the latest of the environmental maps delivered sequentially, based on time-varying changes in the position of the object represented in environmental maps delivered earlier than the latest environmental map, so that the position of the object represented in the latest environmental map is changed to the position of the object at the time when the one following vehicle reaches the position of the leading vehicle represented in the latest environmental map, and control travel of the one following vehicle so that the distance between the one following vehicle and the object represented in the updated environmental map is not less than a predetermined distance.

The platooning control system according to the present disclosure can control platooning of a plurality of vehicles appropriately.

DESCRIPTION OF EMBODIMENTS

A platooning control system that can control platooning of a plurality of vehicles appropriately will now be described in detail with reference to the attached drawings. The platooning control system includes a platoon controller configured to generate environmental maps used for platooning of a plurality of vehicles, and one or more travel controllers configured to respectively control travel of one or more following vehicles following a leading vehicle traveling at the front of the plurality of vehicles.

One of the travel controllers, which controls travel of one of the one or more following vehicles, detects an object represented in environmental data outputted by an environmental sensor mounted on the one following vehicle from the environmental data. The travel controller transmits object information indicating the position of the detected object to the platoon controller.

The platoon controller sequentially generates the environmental maps each representing the position of an object in an area around the plurality of vehicles, using the object information transmitted by the travel controller. The platoon controller sequentially delivers the environmental maps to each of the one or more following vehicles.

The travel controller updates the latest of the environmental maps delivered sequentially, based on time-varying changes in the position of the object represented in environmental maps delivered earlier than the latest environmental map, so that the position of the object represented in the latest environmental map is changed to the position of the object at the time when the one following vehicle reaches the position of the leading vehicle represented in the latest environmental map. The travel controller then controls travel of the one following vehicle so that the one following vehicle does not approach within a predetermined distance of the object represented in the updated environmental map.

Figure 1:
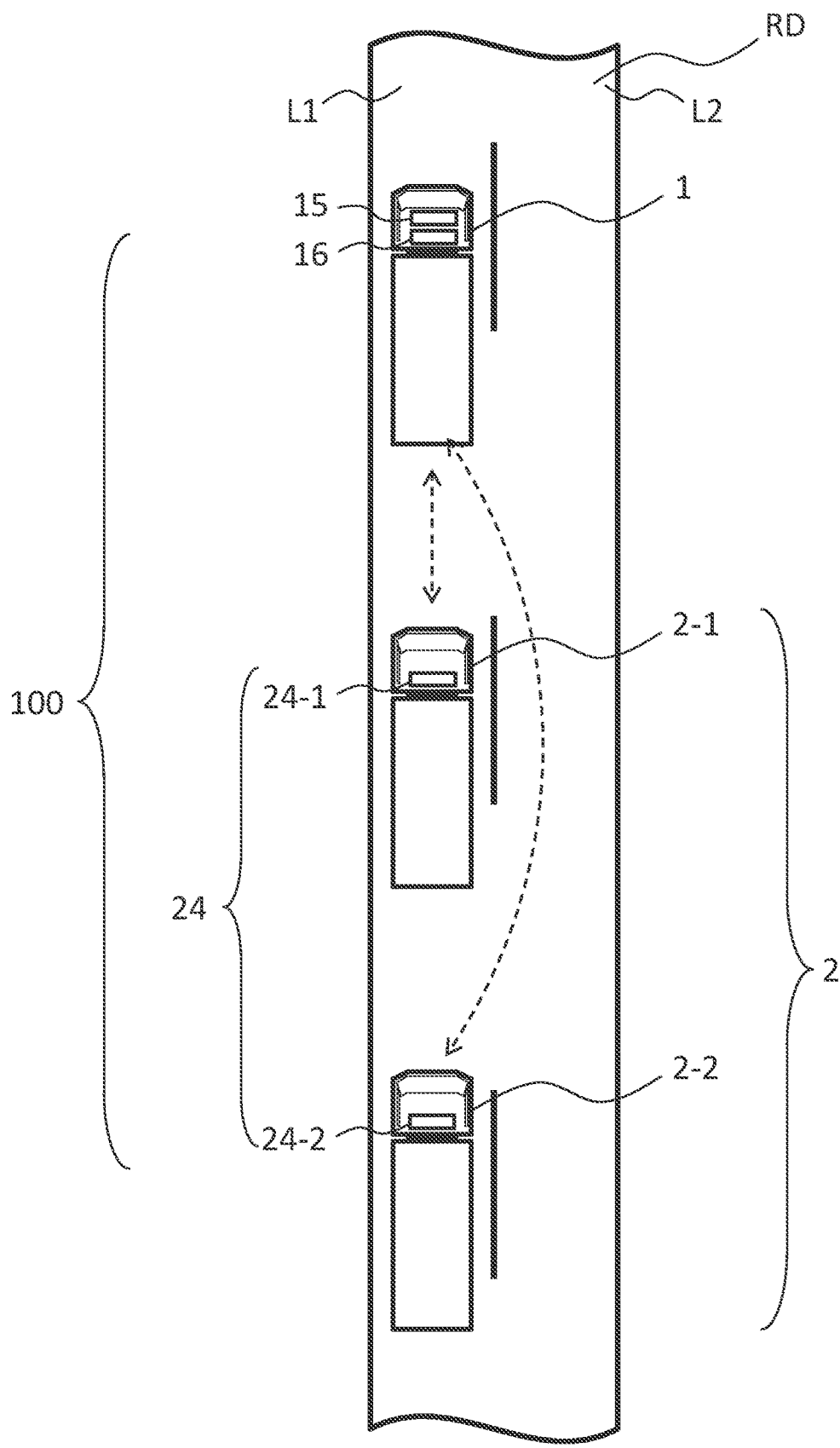
FIG. 1 schematically illustrates the configuration of a platooning control system.
Figure 2:
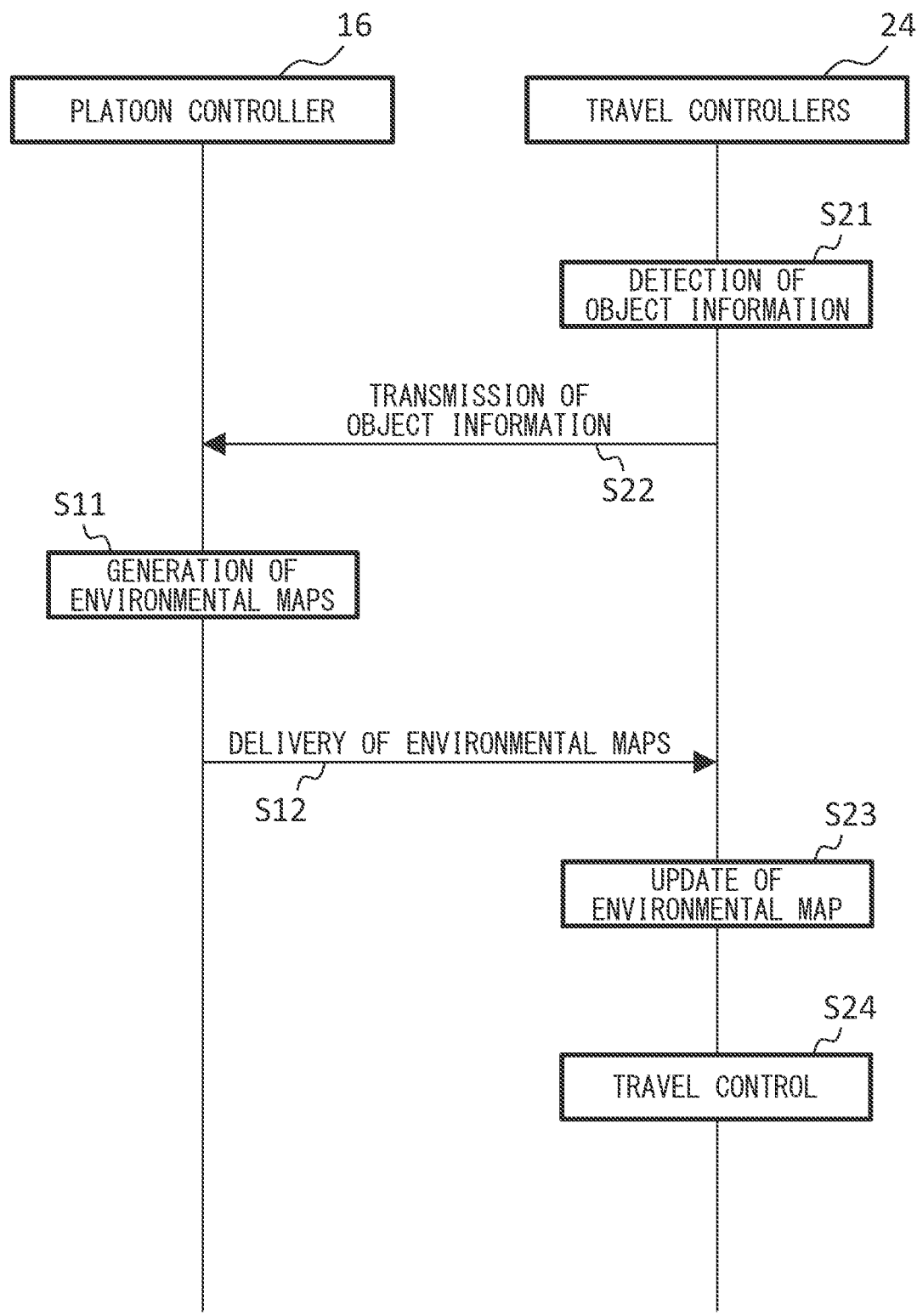
FIG. 2 illustrates the sequence of operation of a platooning control process.

FIG. 1 schematically illustrates the configuration of a platooning control system. FIG. 2 illustrates the sequence of operation of a platooning control process.

The platooning control system 100 includes a platoon controller 16 and travel controllers 24-1 and 24-2 (hereafter collectively referred to as "travel controllers 24"). The platoon controller 16 is mounted on a leading vehicle 1 traveling at the front of a plurality of vehicles, together with a lead controller 15 that controls travel of the leading vehicle 1. The travel controllers 24-1 and 24-2 are mounted on following vehicles 2-1 and 2-2 following the leading vehicle 1 and control travel of the following vehicles 2-1 and 2-2 (hereafter collectively referred to as "following vehicles 2"), respectively.

The platoon controller 16 is communicably connected to the travel controllers 24, using a communication standard, such as PC5 communication of C-V2X (Cellular Vehicle-to-Everything) technology. A road RD being traveled by the leading vehicle 1 and the following vehicles 2 includes lanes L1 and L2. The leading vehicle 1 and the following vehicles 2 travel as a platoon on the lane L1 of the road RD under control by the platooning control system 100 so that each following vehicle 2 follows the leading vehicle 1.

In the platooning control system 100, each travel controller 24 first detects an object represented in environmental data outputted by an environmental sensor mounted on the host vehicle from the environmental data (step S21). Each travel controller 24 transmits object information indicating the position of the detected object to the platoon controller 16 (step S22).

The platoon controller 16 generates environmental maps each representing the position of an object in an area around the plurality of vehicles, using the object information transmitted by each travel controller 24 (step S11). The platoon controller 16 delivers the environmental maps to each travel controller 24 (step S12).

Each travel controller 24 updates the latest of the delivered environmental maps, based on time-varying changes in the position of the object represented in environmental maps delivered earlier than the latest environmental map, so that the position of the object represented in the latest environmental map is changed to the position of the object at the time when the host vehicle reaches the position of the leading vehicle 1 represented in the latest environmental map (step S23). Each travel controller 24 then controls travel of the host vehicle so that the distance between the host vehicle and the object represented in the updated environmental map is not less than a predetermined distance (step S24).

While the leading vehicle 1 and the following vehicles 2 are traveling as a platoon, the platooning control system 100 repeatedly executes the platooning control process at predetermined intervals (e.g., intervals of ⅒ seconds).

Figure 3:
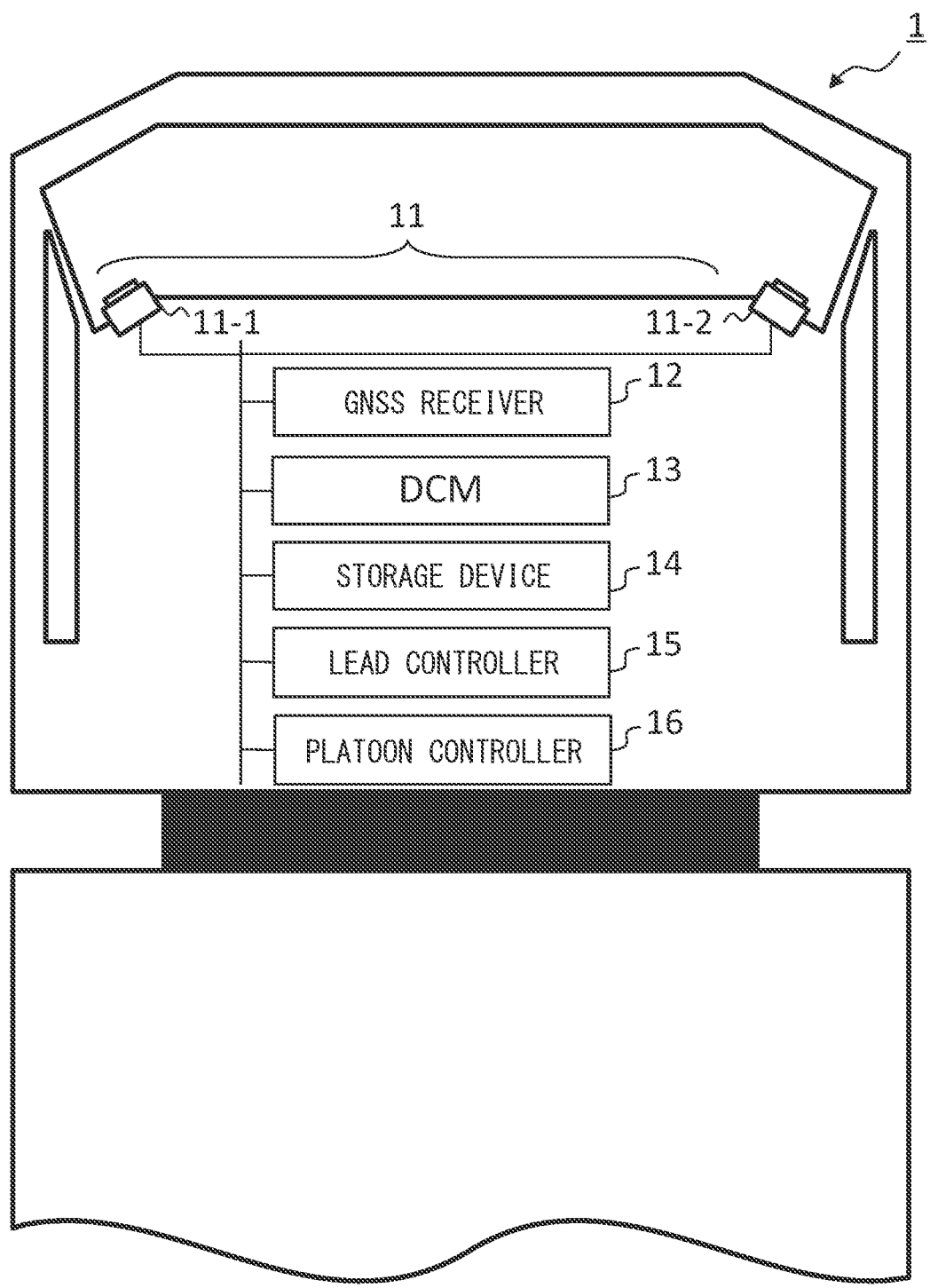
FIG. 3 schematically illustrates the configuration of a leading vehicle equipped with a platoon controller.

FIG. 3 schematically illustrates the configuration of the leading vehicle 1 equipped with the platoon controller 16.

The leading vehicle 1 includes an environmental camera 11, a global navigation satellite system (GNSS) receiver 12, a data communication module (DCM) 13, and a storage device 14, in addition to the lead controller 15 and the platoon controller 16. The environmental camera 11, the GNSS receiver 12, the data communication module 13, and the storage device 14 are communicably connected to the lead controller 15 and the platoon controller 16 via an in-vehicle network conforming to a standard such as a controller area network.

The environmental camera 11 is an example of the environmental sensor for detecting the surrounding situation of the leading vehicle 1. The environmental camera 11 includes a two-dimensional detector constructed from an array of optoelectronic transducers, such as CCD or C-MOS, having sensitivity to visible light and a focusing optical system that forms an image of a target region on the two-dimensional detector. The environmental camera 11 includes a left front environmental camera 11-1 and a right front environmental camera 11-2. The left front environmental camera 11-1 is disposed, for example, in an upper left front area of the interior of the vehicle and oriented to the left front whereas the right front environmental camera 11-2 is disposed, for example, in an upper right front area of the interior of the vehicle and oriented to the right front. The environmental camera 11 takes pictures of the surrounding situation of the leading vehicle 1 through a windshield every predetermined capturing period (e.g., $\frac{1}{30}$ to $\frac{1}{10}$ seconds), and outputs environmental images representing the surrounding situation as environmental data. The number of cameras constituting the environmental camera 11 may be one or three or more. As the environmental sensor, the leading vehicle 1 may include a light detection and ranging (LiDAR) sensor or a radio detection and ranging (RADAR) sensor. The LiDAR sensor or the RADAR sensor outputs a range image whose pixels each have a value depending on the distance to an object represented in the pixel, based on the surrounding situation of the leading vehicle 1, as the environmental data.

The GNSS receiver 12 receives GNSS signals from GNSS satellites at predetermined intervals, and determines the position of the leading vehicle 1, based on the received GNSS signals. The GNSS receiver 12 outputs a positioning signal indicating the result of determination of the position of the leading vehicle 1 based on the GNSS signals to the lead controller 15 via the in-vehicle network at predetermined intervals.

The data communication module 13, which is an example of a vehicle communication unit, is a device to execute processing for wireless communication conforming to a predetermined wireless communication standard, such as "4G (4th Generation)" or "5G (5th Generation)." The data communication module 13 is connected to data communication modules (described below) included in the following vehicles 2, for example, using PC5 communication of C-V2X technology. The data communication module 13 includes data received from the platoon controller 16 in an uplink wireless signal, and transmits the wireless signal to the data communication modules included in the following vehicles 2. Additionally, the data communication module 13 passes data included in wireless signals received from the data communication modules included in the following vehicles 2 to the platoon controller 16. The data communication module 13 may be implemented as a part of the platoon controller 16.

The storage device 14, which is an example of a storage unit, includes, for example, a hard disk drive or a nonvolatile semiconductor memory. The storage device 14 stores map data including information on features such as lane-dividing lines in association with their positions.

The lead controller 15 is an electronic control unit (ECU) including a communication interface, a memory, and a processor. The lead controller 15 detects an object from environmental data outputted by the environmental camera 11, and controls travel of the leading vehicle 1 so that the distance between the leading vehicle 1 and the detected object is not less than a predetermined distance.

The platoon controller 16 is an ECU including a communication interface, a memory, and a processor. The platoon controller 16 generates environmental maps, using object information indicating the position of an object detected from environmental images outputted by environmental cameras respectively mounted on the plurality of vehicles, and delivers the generated environmental maps to the following vehicles.

Figure 4:
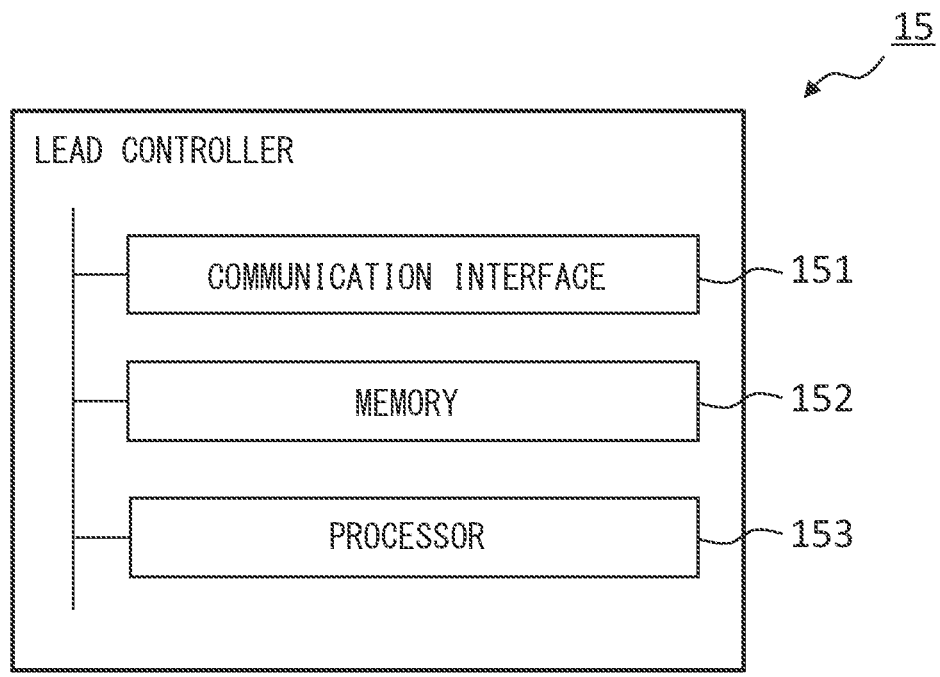
FIG. 4 illustrates the hardware configuration of a lead controller.

FIG. 4 illustrates the hardware configuration of the lead controller 15. The lead controller 15 includes a communication interface 151, a memory 152, and a processor 153.

The communication interface 151, which is an example of a communication unit, includes a communication interface circuit for connecting the lead controller 15 to the in-vehicle network. The communication interface 151 provides received data for the processor 153, and outputs data provided from the processor 153 to an external device.

The memory 152, which is another example of a storage unit, includes volatile and nonvolatile semiconductor memories. The memory 152 stores various types of data used for processing by the processor 153, e.g., parameters of a neural network used as a classifier for identifying surrounding objects from environmental data outputted by the environmental camera 11. The memory 152 also stores various application programs, such as a leading travel control program to execute a leading travel control process.

The processor 153, which is an example of a control unit, includes one or more processors and a peripheral circuit thereof. The processor 153 may further include another operating circuit, such as a logic-arithmetic unit, an arithmetic unit, or a graphics processing unit.

Figure 5:
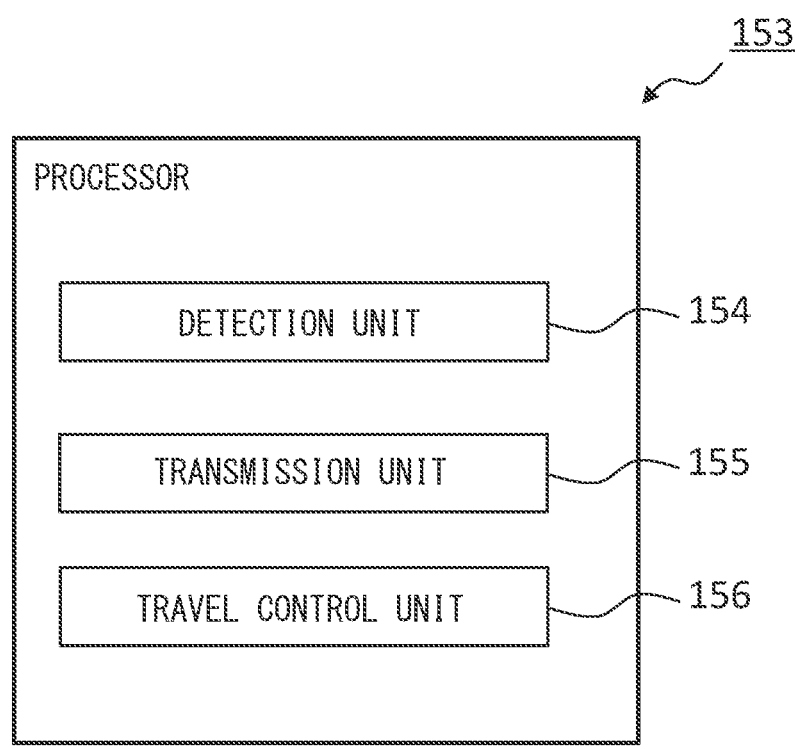
FIG. 5 is a functional block diagram of a processor included in the lead controller.

FIG. 5 is a functional block diagram of the processor 153 included in the lead controller 15.

As its functional blocks, the processor 153 of the lead controller 15 includes a detection unit 154, a transmission unit 155, and a travel control unit 156. These units included in the processor 153 are functional modules implemented by a computer program stored in the memory 152 and executed by the processor 153. The computer program for achieving the functions of the processor 153 may be provided in a form recorded on a computer-readable and portable medium, such as a semiconductor memory, a magnetic medium, or an optical medium. Alternatively, the units included in the processor 153 may be implemented in the lead controller 15 as separate integrated circuits, microprocessors, or firmware.

The detection unit 154 detects an object represented in an environmental image outputted by the environmental camera 11, by inputting the environmental image into a classifier that has been trained to identify the position of an object.

The classifier may be, for example, a convolutional neural network (CNN) including convolution layers connected in series from the input toward the output. A large number of images representing objects to be detected, such as other vehicles and lane-dividing lines, and the types of the objects represented in the images are inputted into a CNN as training data. The CNN that has been trained with the training data operates as a classifier that detects an object and that outputs the type of the object and an object region representing the object in an image.

The detection unit 154 estimates the real-space position of the detected object, using the current position and orientation of the leading vehicle 1, the direction from the leading vehicle 1 to the object, and an estimated distance from the leading vehicle 1 to the object.

The detection unit 154 identifies the current position of the leading vehicle 1, for example, based on a positioning signal obtained from the GNSS receiver 12. Additionally, the detection unit 154 identifies the orientation of the leading vehicle 1, for example, by detecting a feature such as a lane-dividing line from the environmental image and comparing the detected feature with a corresponding feature represented in the map data stored in the storage device 14.

The detection unit 154 estimates the direction from the leading vehicle 1 to the object, for example, using the position of the object in the environmental image, the focal length of the focusing optical system of the environmental camera 11, the inclination of the optical axis of the focusing optical system of the environmental camera 11 relative to the travel direction of the leading vehicle 1.

The detection unit 154 estimates the distance from the leading vehicle 1 to the object, for example, based on a reference size of the object in the real space, the size of the object region represented in the environmental image, and internal parameters of the environmental camera 11. For each type of object, the reference size of the object in the real space is prestored in the memory 152. The detection unit 154 identifies the real-space size of the object represented in the environmental image by searching the memory 152, using the type of the object outputted from the classifier into which the environmental image is inputted. The internal parameters of the environmental camera 11 include, for example, the focal length of the focusing optical system of the environmental camera 11 and the pixel size of the environmental image.

The detection unit 154 outputs the real-space position estimated for the detected object as object information.

The transmission unit 155 transmits the object information indicating the position of the object detected by the detection unit 154 to the platoon controller 16 via the communication interface 151 and the in-vehicle network.

The travel control unit 156 obtains information on lane-dividing lines around the current position of the leading vehicle 1 indicated by a positioning signal received from the GNSS receiver 12 via the communication interface 151 and the in-vehicle network, from the storage device 14, which stores a high-precision map. The travel control unit 156 outputs a control signal to a travel mechanism (not shown) of the leading vehicle 1 via the communication interface 151 so that the leading vehicle 1 travels along a lane-dividing line. Additionally, the travel control unit 156 controls travel of the leading vehicle 1 so that the distance between the leading vehicle 1 and the object detected by the detection unit 154, e.g., a vehicle traveling ahead of the leading vehicle 1 on the travel lane of the leading vehicle 1 is not less than a predetermined distance. The travel mechanism includes, for example, an engine or a motor for powering the leading vehicle 1, brakes for decelerating the leading vehicle 1, and a steering mechanism for steering the leading vehicle 1.

Figure 6:
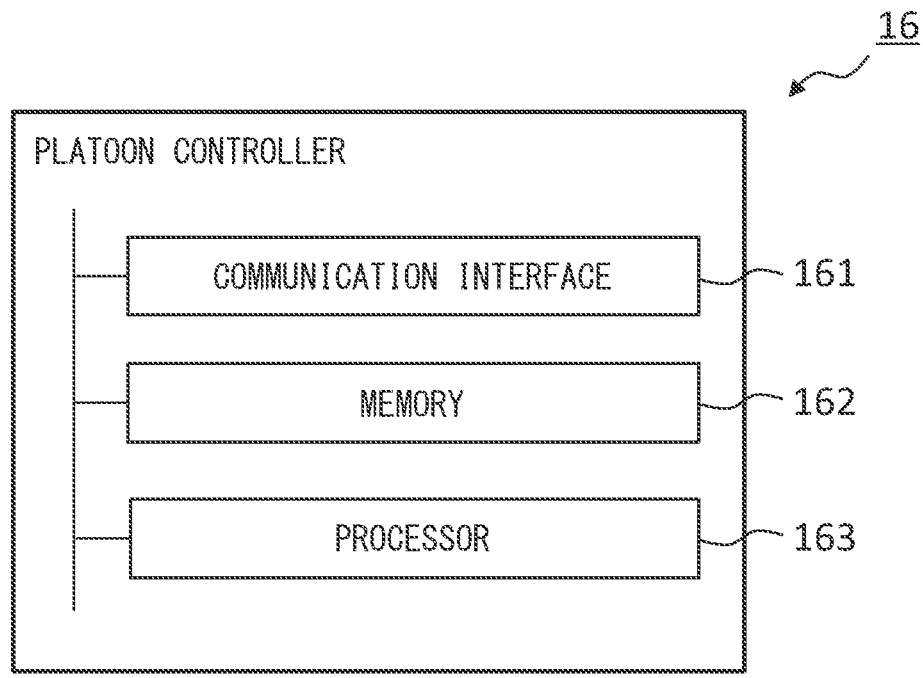
FIG. 6 illustrates the hardware configuration of the platoon controller.

FIG. 6 illustrates the hardware configuration of the platoon controller 16. The platoon controller 16 includes a communication interface 161, a memory 162, and a processor 163.

The communication interface 161, which is an example of a communication unit, includes a communication interface circuit for connecting the platoon controller 16 to the in-vehicle network. The communication interface 161 provides received data for the processor 163, and outputs data provided from the processor 163 to an external device.

The memory 162, which is another example of a storage unit, includes volatile and nonvolatile semiconductor memories. The memory 162 stores various types of data used for processing by the processor 163, e.g., object information indicating the position of an object in an area around each following vehicle 2 transmitted from the respective travel controller 24 of each following vehicle 2. The memory 162 also stores various application programs, such as a platoon control program to execute a platoon control process.

The processor 163, which is an example of a control unit, includes one or more processors and a peripheral circuit thereof. The processor 163 may further include another operating circuit, such as a logic-arithmetic unit, an arithmetic unit, or a graphics processing unit.

Figure 7:
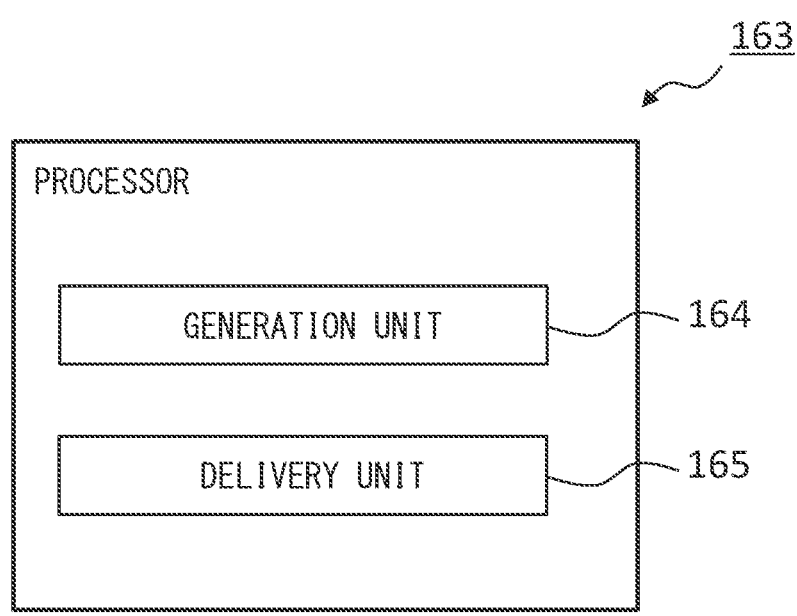
FIG. 7 is a functional block diagram of a processor included in the platoon controller.

FIG. 7 is a functional block diagram of the processor 163 included in the platoon controller 16.

As its functional blocks, the processor 163 of the platoon controller 16 includes a generation unit 164 and a delivery unit 165. These units included in the processor 163 are functional modules implemented by a computer program stored in the memory 162 and executed by the processor 163. The computer program for achieving the functions of the processor 163 may be provided in a form recorded on a computer-readable and portable medium, such as a semiconductor memory, a magnetic medium, or an optical medium. Alternatively, the units included in the processor 163 may be implemented in the platoon controller 16 as separate integrated circuits, microprocessors, or firmware.

The generation unit 164 generates environmental maps each representing the position of an object in an area around the plurality of vehicles, using object information indicating the position of an object detected from environmental images outputted by environmental cameras respectively mounted on the plurality of vehicles.

The generation unit 164 may generate a trajectory along which the leading vehicle 1 and the following vehicles 2 will travel as a platoon so that the distance to the position of the object represented in the environmental map is not less than a predetermined distance.

Figure 8:
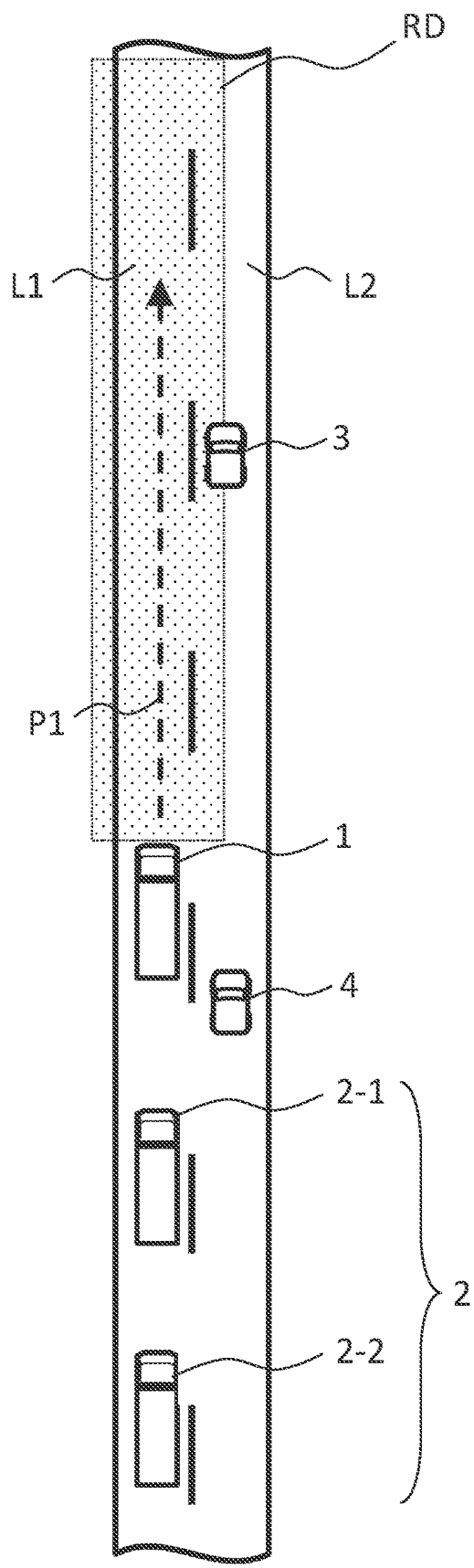
FIG. 8 illustrates an example of a first situation of platooning.
Figure 9:
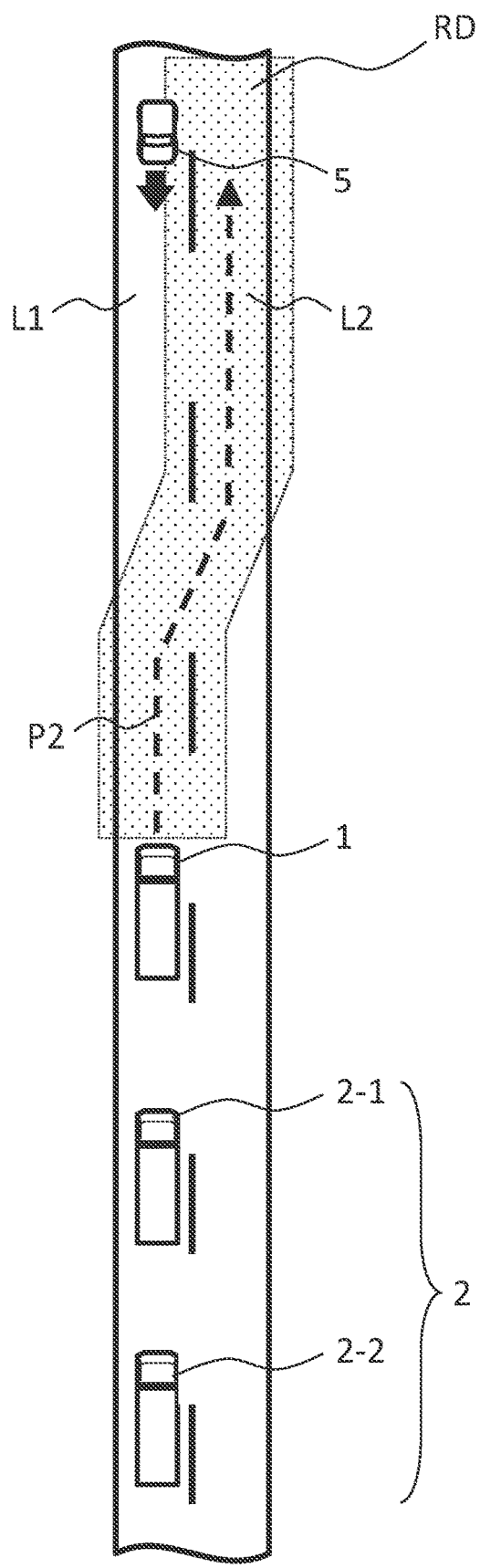
FIG. 9 illustrates an example of a second situation of platooning.

FIG. 8 illustrates an example of a first situation of platooning. FIG. 9 illustrates an example of a second situation of platooning.

In the first situation shown in FIG. 8, the leading vehicle 1 and the following vehicles 2 are traveling as a platoon on a lane L1 of a road RD including lanes L1 and L2. A vehicle 3 is traveling on the lane L2 of the road RD ahead of the leading vehicle 1. A vehicle 4 is traveling on the lane L2 of the road RD behind the leading vehicle 1.

The generation unit 164 determines a trajectory P1 such that the distances to the vehicles 3 and 4 are not less than a predetermined distance (e.g., 100 m in the travel direction and 1.5 m in the width direction of the road RD), and generates trajectory information representing the trajectory P1.

In the second situation shown in FIG. 9, the leading vehicle 1 and the following vehicles 2 are traveling as a platoon on a lane L1 of a road RD including lanes L1 and L2. A vehicle 5 is traveling toward the leading vehicle 1 (traveling in the opposite direction) on the lane L1 of the road RD ahead of the leading vehicle 1.

The generation unit 164 determines a trajectory P2 including a lane change from the lane L1 to the lane L2 so that the distance to the vehicle 5 is not less than the predetermined distance, and generates trajectory information representing the trajectory P2.

In the second situation shown in FIG. 9, the vehicle 5 is represented in an environmental image outputted by one of environmental cameras of the leading vehicle 1 and the following vehicles 2. The generation unit 164 receives time-series object information indicating the position of the vehicle 5 detected from environmental images sequentially outputted by the environmental camera 11 mounted on the leading vehicle 1, from the lead controller 15 via the in-vehicle network. The generation unit 164 also receives time-series object information indicating the position of the vehicle 5 detected from environmental images sequentially outputted by environmental cameras mounted on the following vehicles 2 (described below), from the travel controllers 24 mounted on the following vehicles 2 via the data communication module 13.

The generation unit 164 generates an environmental map representing the position of the object a predetermined time later, using the time-series object information obtained from the lead controller 15 and the travel controllers 24 mounted on the following vehicles 2. The environmental map indicates, for example, probabilities that an object exists in respective regions into which an area around the leading vehicle 1 and the following vehicles 2 is divided. The environmental map includes the position of the leading vehicle 1.

Figure 10:
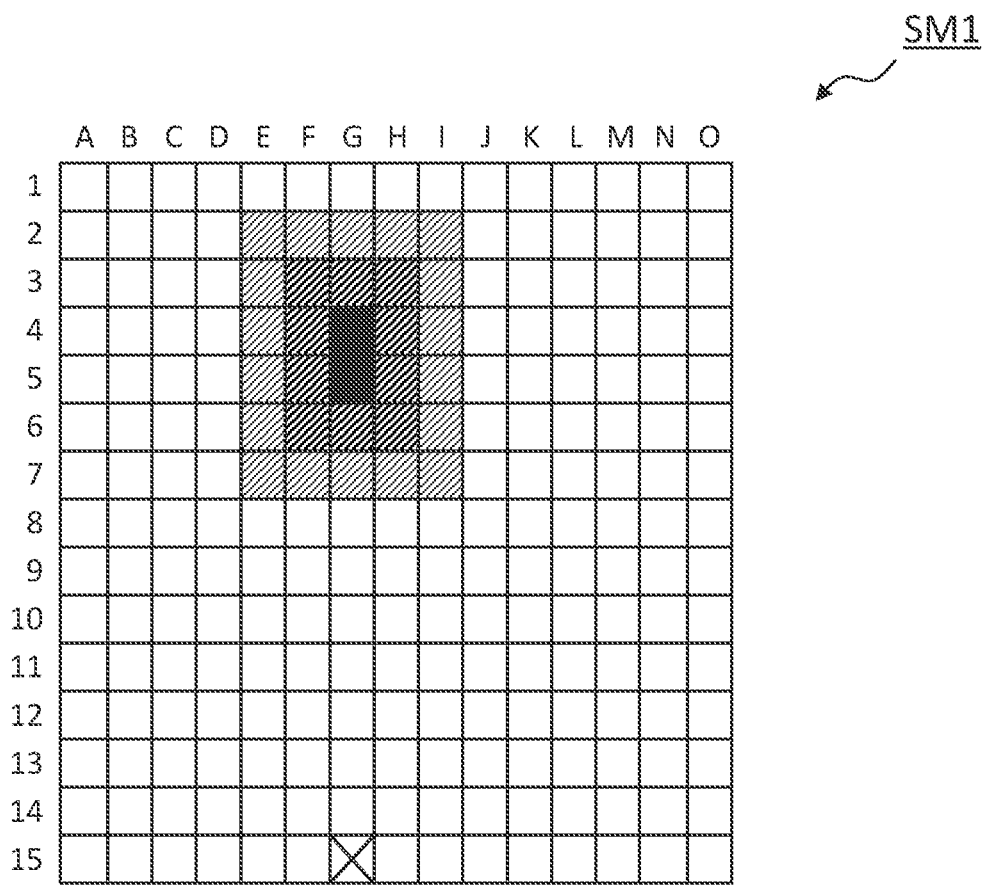
FIG. 10 illustrates an example of an environmental map.

FIG. 10 illustrates an example of the environmental map. In FIG. 10, reference symbols (A to O and 1 to 15) are given on the upper and left sides of an environmental map SM1 for illustrative purposes. In the following description, regions included in the environmental map SM1 are referred to with reference symbols, e.g., the region in row 1 of column A is referred to as A1, and the region in row 15 of column O as O15.

Of the regions represented in the environmental map SM1, solid black regions G4 and G5 indicate that an object is highly likely (e.g., not less than 75%) to exist. The thickly hatched regions represented in the environmental map SM1 (the regions inside the rectangle having regions F3 and H6 as vertexes except regions G4 and G5) indicate that an object is likely (e.g., not less than 50% and less than 75%) to exist. The thinly hatched regions represented in the environmental map SM1 (the regions inside the rectangle having regions E2 and I7 as vertexes and outside the rectangle having the regions F3 and H6 as vertexes) indicate that an object possibly (e.g., not less than 25% and less than 50%) exists. Of the regions represented in the environmental map SM1, region G15 with a cross indicates the position of the leading vehicle 1.

With reference to FIG. 7 again, the delivery unit 165 delivers the environmental maps generated by the generation unit 164 to the following vehicles 2 via the communication interface 161, the data communication module 13, and a wireless communication channel. The delivery unit 165 may deliver the trajectory information generated by the generation unit 164 to the following vehicles 2. The delivery unit 165 may also deliver the environmental maps and the trajectory information to the lead controller 15 via the communication interface 161 and the in-vehicle network.

Figure 11:
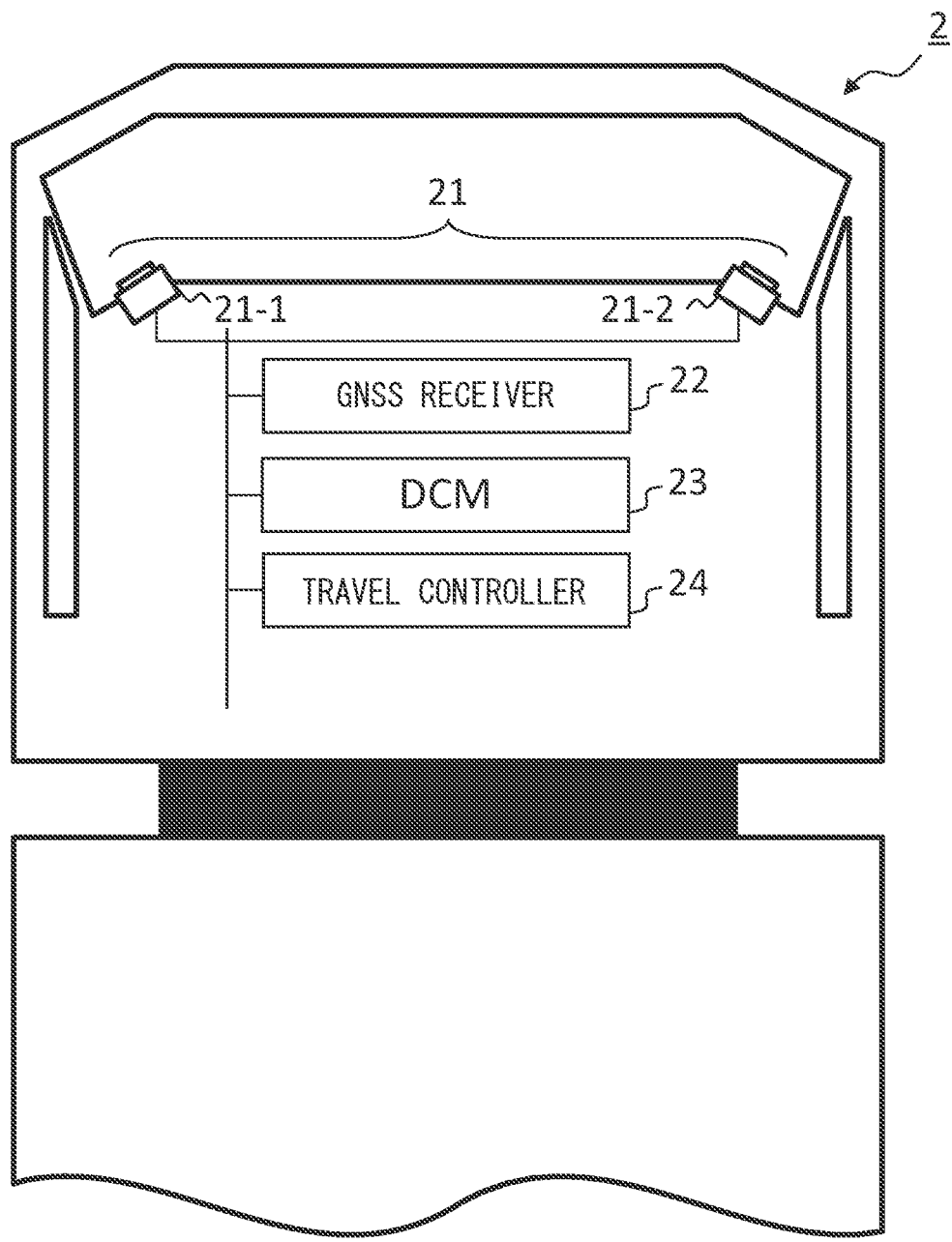
FIG. 11 schematically illustrates the configuration of a following vehicle equipped with a travel controller.

FIG. 11 schematically illustrates the configuration of one of the following vehicles 2 equipped with the travel controller 24.

The following vehicle 2 includes an environmental camera 21, a GNSS receiver 22, and a data communication module (DCM) 23, in addition to the travel controller 24. The environmental camera 21, the GNSS receiver 22, and the data communication module 23 are communicably connected to the travel controller 24 via an in-vehicle network conforming to a standard such as a controller area network.

The environmental camera 21, the GNSS receiver 22, and the data communication module 23 included in the following vehicle 2 are the same as the environmental camera 11, the GNSS receiver 12, and the data communication module 13 included in the leading vehicle 1, respectively, and thus detailed explanation thereof is omitted herein.

The travel controller 24 is an ECU including a communication interface, a memory, and a processor. The travel controller 24 detects an object from environmental data outputted by the environmental camera 21, and controls travel of the following vehicle 2 so that the distance between the following vehicle 2 and the detected object is not less than a predetermined distance.

Figure 12:
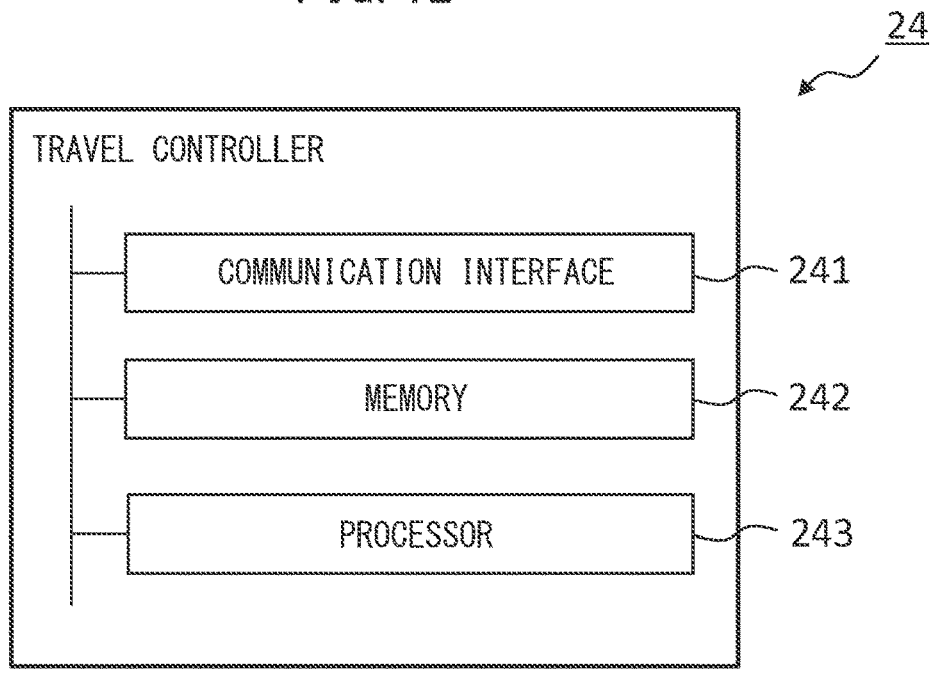
FIG. 12 illustrates the hardware configuration of the travel controller.

FIG. 12 illustrates the hardware configuration of the travel controller 24. The travel controller 24 includes a communication interface 241, a memory 242, and a processor 243.

The communication interface 241, the memory 242, and the processor 243 included in the travel controller 24 are the same as the communication interface 151, the memory 152, and the processor 153 included in the lead controller 15, respectively, and thus detailed explanation thereof is omitted herein.

Figure 13:
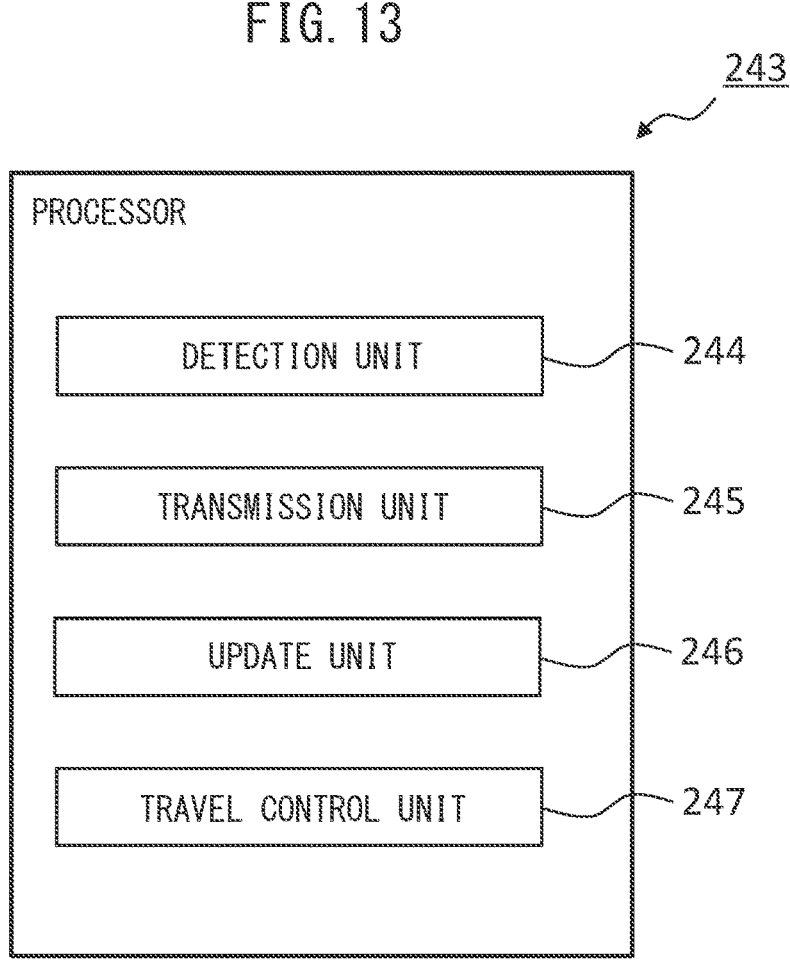
FIG. 13 is a functional block diagram of a processor included in the travel controller.

FIG. 13 is a functional block diagram of the processor 243 included in the travel controller 24.

As its functional blocks, the processor 243 of the travel controller 24 includes a detection unit 244, a transmission unit 245, an update unit 246, and a travel control unit 247. These units included in the processor 243 are functional modules implemented by a computer program stored in the memory 242 and executed by the processor 243. The computer program for achieving the functions of the processor 243 may be provided in a form recorded on a computer-readable and portable medium, such as a semiconductor memory, a magnetic medium, or an optical medium. Alternatively, the units included in the processor 243 may be implemented in the travel controller 24 as separate integrated circuits, microprocessors, or firmware.

The detection unit 244 and the travel control unit 247 included in the processor 243 of the travel controller 24 are the same as the detection unit 154 and the travel control unit 156 included in the processor 153 of the lead controller 15, respectively, and thus detailed explanation thereof is omitted herein.

The transmission unit 245 transmits object information indicating the real-space position of an object detected by the detection unit 244 to the platoon controller 16 via the communication interface 241, the data communication module 23, and a wireless communication network.

The transmission unit 245 may transmit the object information indicating the position of an object detected inside a predetermined area around a delivered trajectory of the platoon to the platoon controller 16, and omit to transmit the object information indicating the position of an object detected outside the predetermined area to the platoon controller 16.

With reference to FIG. 8 again, the transmission unit 245 transmits object information indicating the position of the vehicle 3 detected inside a predetermined area around the trajectory P1 to the platoon controller 16. In contrast, the transmission unit 245 does not transmit object information indicating the position of the vehicle 4 detected outside the predetermined area around the trajectory P1 to the platoon controller 16.

The predetermined area is defined, for example, as an area covering the trajectory P1 along the lane L1 and having a width of 3 m from the center of a pair of lane-dividing lines demarcating the lane L1. Of features detected by the detection unit 244 from an environmental image, the transmission unit 245 identifies the positions of a pair of lane-dividing lines demarcating the lane L1. The transmission unit 245 then sets an area having a width of 3 m from the center of the identified pair of lane-dividing lines as the predetermined area.

Such transmission of object information to the platoon controller 16 by the transmission unit 245 enables the travel controller 24 to prevent transmitting object information having no effect on platooning and to make efficient use of the communication band.

With reference to FIG. 13 again, the update unit 246 updates the latest of the environmental maps delivered sequentially from the platoon controller 16, based on time-varying changes in the position of the object represented in environmental maps delivered earlier than the latest environmental map, so that the position of the object represented in the latest environmental map is changed to the position of the object at the time when the following vehicle 2 reaches the position of the leading vehicle 1 represented in the latest environmental map.

The update unit 246 calculates the distance between the position of the leading vehicle 1 represented in the latest environmental map and the current position of the following vehicle 2 indicated by a positioning signal received from the GNSS receiver 22 via the communication interface 241 and the in-vehicle network.

The update unit 246 divides the distance between the position of the leading vehicle 1 represented in the latest environmental map and the current position of the following vehicle 2 by the current speed of the following vehicle 2, thereby estimating the time required for the following vehicle 2 to reach the position of the leading vehicle 1 represented in the latest environmental map. The update unit 246 adds the estimated time, which is required for the following vehicle 2 to reach the position of the leading vehicle 1 represented in the latest environmental map, to the current time, thereby calculating the time when the following vehicle 2 reaches the position of the leading vehicle 1 represented in the latest environmental map.

The update unit 246 estimates a future position of the object at the time when the following vehicle 2 reaches the position of the leading vehicle 1 represented in the latest environmental map, based on time-varying changes in the position of the object represented in environmental maps delivered from the platoon controller 16 earlier than the latest environmental map. The update unit 246 calculates probabilities that an object exists in respective regions included in the latest environmental map. For example, the update unit 246 applies the least-squares method to the positions of the object represented in the individual environmental maps delivered earlier than the latest environmental map to determine the trajectory of the object, and estimates the future position of the object along the trajectory. To this end, the update unit 246 calculates the probability at the estimated future position lower as the square error between the trajectory of the object determined by the least-squares method and the positions of the object represented in environmental maps delivered earlier than the latest environmental map is larger.

The update unit 246 may apply a prediction filter, such as a Kalman filter or a particle filter, to the positions of the object represented in the individual environmental maps delivered earlier than the latest environmental map to estimate the future position of the object.

The update unit 246 may correct the probabilities that an object exists in respective regions included in the latest environmental map, for example, using delay time of transmission at delivering an environmental map from the leading vehicle 1, processing time for data transmission at the platoon controller 16, and time for data reception at the travel controller 24.

Figure 14:
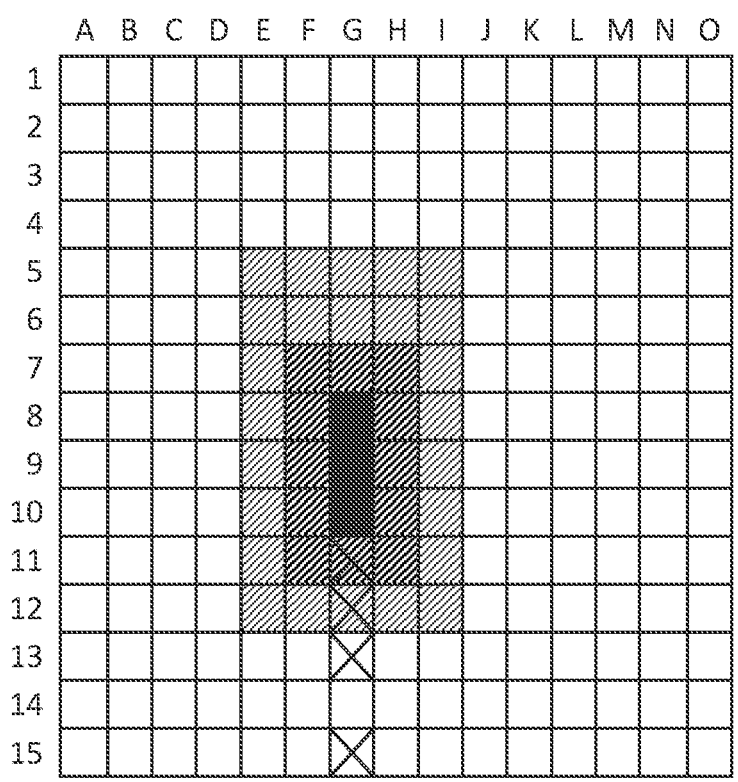
FIG. 14 illustrates an example of an updated environmental map.

FIG. 14 illustrates an example of the updated environmental map. Regions in an updated environmental map SM2 shown in FIG. 14, which is obtained by updating the environmental map SM1, are also referred to with reference symbols, similarly to those in the environmental map SM1 shown in FIG. 9.

The updated environmental map SM2 is an example of an updated environmental map updated by the travel controller 24-1 mounted on the following vehicle 2-1 traveling immediately behind the leading vehicle 1. Of the regions represented in the updated environmental map SM2, regions G11 to G13 with crosses indicate an estimated position of the leading vehicle 1, and region G15 with a cross indicates an estimated position of the following vehicles 2. In other words, the updated environmental map SM2 indicates an estimated position of an object at the time when the following vehicle 2-1 reaches the position of the leading vehicle 1 indicated by the environmental map SM1. The estimated position of the leading vehicle 1 may be a position estimated from changes in the past position of the leading vehicle 1, and need not necessarily indicate the actual position of the leading vehicle 1.

Of the regions represented in the updated environmental map SM2, solid black regions G8 to G10 indicate that an object is highly likely (e.g., not less than 75%) to exist. The thickly hatched regions represented in the updated environmental map SM2 (the regions inside the rectangle having regions F7 and H11 as vertexes except regions G8 to G10) indicate that an object is likely (e.g., not less than 50% and less than 75%) to exist. The thinly hatched regions represented in the updated environmental map SM2 (the regions inside the rectangle having regions E5 and I12 as vertexes and outside the rectangle having the regions F7 and H11 as vertexes) indicate that an object possibly (e.g., not less than 25% and less than 50%) exists.

The platooning control system 100 operating as described above can control platooning of the plurality of vehicles appropriately even if a blind spot is caused by a leading vehicle at a following vehicle. In the platooning control system 100, calculation resources of the travel controllers can be reduced because each vehicle need not execute operation of trajectory information of the other vehicles.

The present disclosure has described an embodiment in which the platoon controller 16 is mounted on the leading vehicle 1. However, the embodiment of the platooning control system is not limited thereto, and the platoon controller 16 may be mounted on any of the following vehicles.

Note that those skilled in the art can make various changes, substitutions, and modifications without departing from the spirit and scope of the present disclosure.

What is claimed is:

1. A travel controller for controlling travel of a following vehicle following a leading vehicle of a plurality of vehicles traveling as a platoon, the travel controller comprising a processor configured to:
    detect the position of at least one object represented in environmental data outputted by an environmental sensor mounted on the following vehicle from the environmental data,
    transmit object information indicating the position of the detected object to a platoon controller configured to generate environmental maps each representing the position of an object in an area around the leading vehicle, update the latest of the environmental maps delivered sequentially from the platoon controller, based on time-varying changes in the position of the object represented in environmental maps delivered earlier than the latest environmental map, so that the position of the object represented in the latest environmental map is changed to the position of the object at the time when the following vehicle reaches the position of the leading vehicle represented in the latest environmental map, and control travel of the following vehicle so that the distance between the following vehicle and the object represented in the updated environmental map is not less than a predetermined distance.

2. The travel controller according to claim 1, wherein at the update the processor updates the environmental map so that the environmental map indicates probabilities that an object exists in respective regions included in the environmental map at the time when the following vehicle reaches the position of the leading vehicle represented in the environmental map.

3. The travel controller according to claim 1, wherein at the transmission the processor transmits the object information indicating the position of one of the at least one object detected inside a predetermined area around a predetermined trajectory of the platoon to the platoon controller, and does not transmit the object information indicating the position of one of the at least one object detected outside the predetermined area to the platoon controller.

4. A method for controlling travel of a following vehicle following a leading vehicle of a plurality of vehicles traveling as a platoon, the method comprising:

detecting the position of an object represented in environmental data outputted by an environmental sensor mounted on the following vehicle from the environmental data;

transmitting object information indicating the position of the detected object to a platoon controller configured to generate environmental maps each representing the position of an object in an area around the leading vehicle;

updating the latest of the environmental maps delivered sequentially from the platoon controller, based on time-varying changes in the position of the object represented in environmental maps delivered earlier than the latest environmental map, so that the position of the object represented in the latest environmental map is changed to the position of the object at the time when the following vehicle reaches the position of the leading vehicle represented in the latest environmental map; and controlling travel of the following vehicle so that the distance between the following vehicle and the object represented in the updated environmental map is not less than a predetermined distance.

5. A platooning control system comprising a platoon controller configured to generate environmental maps used for platooning of a plurality of vehicles, and one or more travel controllers configured to respectively control travel of one or more following vehicles following a leading vehicle traveling at the front of the plurality of vehicles, the platoon controller comprising a processor configured to:

generate the environmental maps each representing the position of an object in an area around the plurality of vehicles, using object information indicating the position of an object detected from environmental data outputted by environmental sensors respectively mounted on the plurality of vehicles, and deliver the environmental maps to each of the one or more following vehicles, one of the travel controllers, which controls travel of one of the one or more following vehicles, comprising a processor configured to:

detect the position of an object represented in environmental data outputted by an environmental sensor mounted on the one following vehicle from the environmental data, transmit object information indicating the position of the detected object to the platoon controller, update the latest of the environmental maps delivered sequentially, based on time-varying changes in the position of the object represented in environmental maps delivered earlier than the latest environmental map, so that the position of the object represented in the latest environmental map is changed to the position of the object at the time when the one following vehicle reaches the position of the leading vehicle represented in the latest environmental map, and control travel of the one following vehicle so that the distance between the one following vehicle and the object represented in the updated environmental map is not less than a predetermined distance.

* * * * *